US005275857A

United States Patent [19]

Long

[11] Patent Number: 5,275,857

[45] Date of Patent: Jan. 4, 1994

[54] CONTINUOUS FORM

[76] Inventor: John A. Long, 41 Lamont Ave., Scarborough, Ontario M1S 1A8, Canada

[21] Appl. No.: 816,712

[22] Filed: Jan. 3, 1992

Related U.S. Application Data

[63] Continuation-in-part of Ser. No. 800,285, Nov. 29, 1991, Pat. No. 5,219,631.

[51] Int. Cl.[5] .................................................. B32B 3/10

[52] U.S. Cl. ...................................... 428/43; 428/136; 281/5; 462/26; 462/46

[58] Field of Search ................. 428/43, 136, 131, 156; 462/26, 25, 46, 6, 2, 3; 281/5; 283/62

[56] References Cited

U.S. PATENT DOCUMENTS

| | | | |
|---|---|---|---|
| 465,588 | 12/1891 | Wheeler | 428/43 |
| 2,009,857 | 7/1935 | Potdevin | 93/18 |
| 2,377,348 | 6/1945 | Lee | 283/62 |
| 4,033,611 | 7/1977 | Johnsen | 283/6 |
| 4,050,361 | 9/1977 | Traise | 93/1 F |
| 4,378,223 | 3/1983 | Branecky et al. | 493/439 |
| 4,726,970 | 2/1988 | Morrish et al. | 462/6 |
| 5,071,167 | 12/1991 | O'Brien | 283/79 |

FOREIGN PATENT DOCUMENTS

| | | | |
|---|---|---|---|
| 794233 | 9/1968 | Canada | 281/5 |

*Primary Examiner*—Alexander S. Thomas

[57] ABSTRACT

A paper web comprises separable marginal web feed portions surrounding a continuous form. The continuous form has regularly longitudinal spaced opposed pairs of transverse cut lines extending from each marginal web portion. The pairs of transverse lines leave an uncut middle portion of the web and furthermore the lines extending from each marginal web portion are of uniform length. A perforation or score line runs longitudinally along the inner end of the transverse lines extending from each marginal portion. This web construction permits the continuous form portion of the web to be folded in the direction of motion of the web over the shortest known distance prior to cutting or separating the web at the opposed pairs of lines to form folded sheets. In another embodiment, the transverse cut lines may be replaced by transverse perforation lines in which case the web is burst at these lines prior to folding.

7 Claims, 5 Drawing Sheets

CONTINUOUS FORM

CROSS-REFERENCE TO RELATED APPLICATION

This application is a continuation-in-part of application no. Ser. No. 07/800,285 filed Nov. 29, 1991, now U.S. Pat. No. 5,219,631.

BACKGROUND OF THE INVENTION

1. Field of the Invention

This invention relates to a paper web providing a continuous form.

2. Description of the Related Art

Mass mailings generally rely upon apparatus to feed, cut and fold a continuous form into folded letter sheets for stuffing in an envelope. The continuous form is typically provided in a paper web having pin hole edges for tractor feeding of the web. Furthermore, the web may be perforated across its width at uniform intervals; in such case, the paper web is often referred to as "computer paper". One method of handling a paper web (with or without the noted transverse perforations) is as follows. The paper web is tractor fed to a separating station (if the web is transversely perforated) or a cutting station (if the web is not transversely perforated) and the separate sheets are then conveyed to a folding station whereat automatic arms first fold one marginal portion of the sheet over a medial portion of the sheet and then fold the remaining marginal portion of the sheet over the first mentioned marginal portion and the medial portion of the sheet. This results in a folded letter which has a standard letter fold. One drawback with this method is that once the individual sheets have been cut or separated from the continuous form it is difficult to keep them in registration in order to make the letter folds properly. Furthermore, once cut or separated, the sheets are generally supported underneath which makes a Z-fold for the sheets impossible. By way of explanation, a Z-fold results when one marginal portion of the sheet is folded over the medial portion of the sheet and the other marginal portion of the sheet is folded under the medial portion of the sheet. A Z-fold has an advantage in mass produced letters in that the address at the head of the letter may be on the outside of the letter so that it may appear under a window in an envelope into which the letter is stuffed.

A second method of forming folded letters from the aforenoted paper web involves tractor feeding the web and then buckle folding the leading portion of the web subsequent to which the leading portion is severed from the web resulting in a folded letter sheet. One drawback with this approach is that it cannot be used where inserts have been adhered to the web ahead of the buckle folding station if such inserts are of significant thickness. Thus, for example, this method cannot be used where standard thickness credit cards (which are about 30,000 of an inch in thickness) are attached to each sheet in the continuous form since the continuous form will then jam in the buckle folding rollers.

While not known to be used in the mass production of letter sheets, it is known to progressively fold webs along their length with edge guides which progressively urge a marginal portion of the web towards the center of the web. If this method were employed in the folding of the aforenoted paper web of computer paper (which typically has a width of about 9½ inches), it would require about an eight-foot run to complete a fold of a marginal portion of the web over the medial portion of the web without ripping the paper or causing it to separate at any transverse perforations. Space is generally extremely limited in mail rooms. This method would, therefore, be unsuitable in many mass mailing applications due to the large area that would be taken up by such machinery.

Accordingly, there remains a need for a paper web more suitable for use in the mass production of letters.

SUMMARY OF THE INVENTION

Accordingly to the present invention, there is provided a paper web providing a continuous form, comprising: two marginal web portions, once proximate each side of the web for permitting tractor feeding of the web; a continuous form portion interior of said marginal web portions; a plurality of opposed pairs of transverse cut or perforation lines, one line of each opposed pair extending in said continuous form portion of said web from one of said two marginal web portions and the other line of each opposed pair extending in said continuous form portion of said web from the other of said two marginal web portions, the continuous form portion of said web having a central portion being at least substantially free of any transverse cuts or perforations which are aligned with any opposed pair of transverse lines, all transverse lines of said plurality of said opposed pairs of transverse cut or perforation lines which extend from a given one of said two marginal web portions being of uniform length and said central portion having a width about as great as the length of the shortest of said transverse cut or perforation lines.

BRIEF DESCRIPTION OF THE DRAWINGS

In the figures which disclose example embodiments of the invention.

DESCRIPTION OF THE PREFERRED EMBODIMENTS

Figure 1:
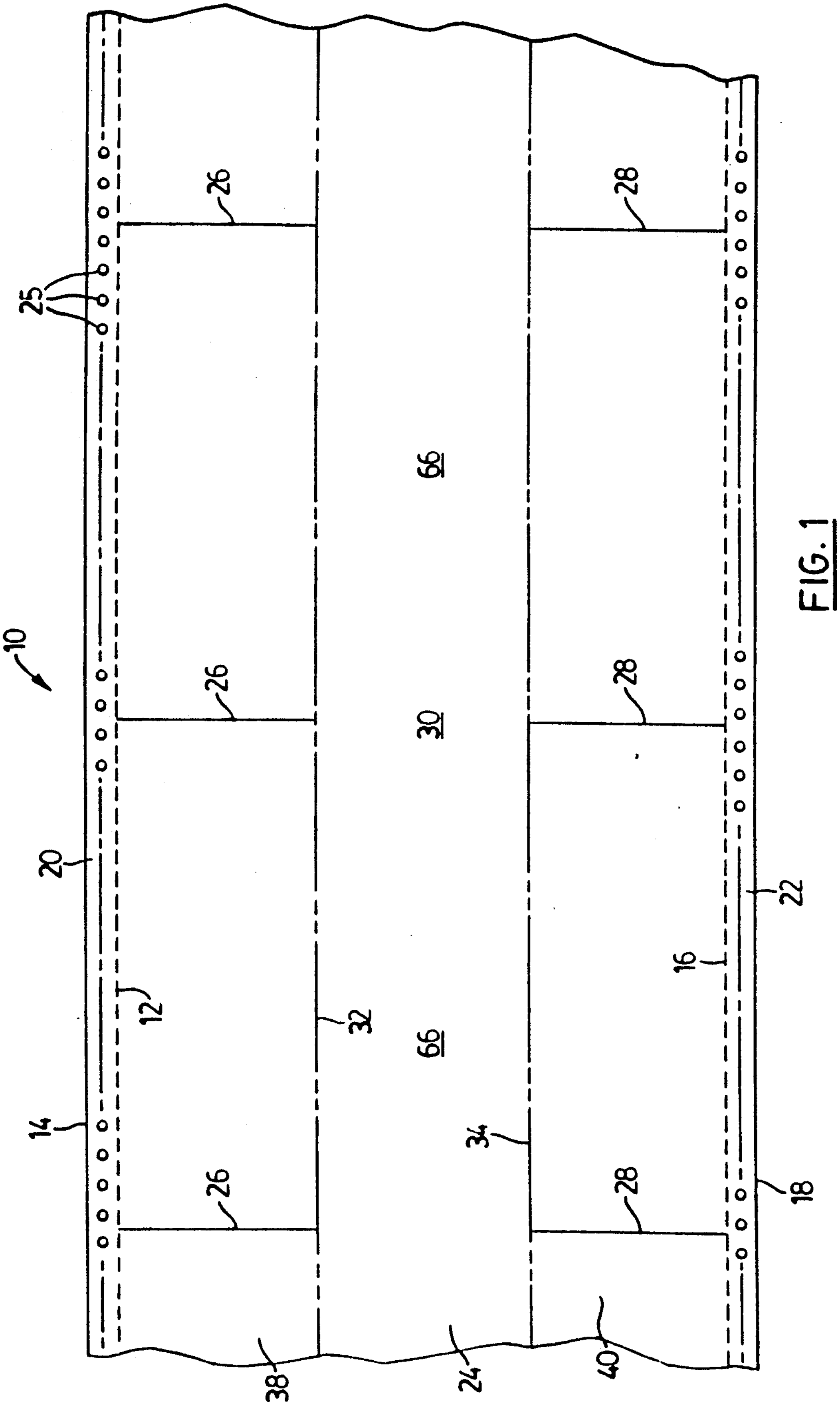
FIG. 1 is a plan view of a paper web made in accordance with this invention.

With reference to FIG. 1, a paper web 10 has a marginal longitudinal line of perforation 12 proximate one side 14 of the web and a second marginal longitudinal line of perforation 16 proximate the other side 18 of the web. These longitudinal lines of perforation delimit marginal web portions 20 and 22. The marginal web portions 20 and 22 each have longitudinal lines of pin holes 25 for tractor feeding of the web.

A continuous form portion 24 extends between the marginal web portions. The continuous form portion 24 of the web has opposed pairs of transverse cuts 26, 28. Cuts 26 extend from the marginal longitudinal line of perforation 12 and cuts 28 extend from the marginal longitudinal line of perforation 16. The opposed pairs of transverse cuts leave a medial web portion 30 which is uncut and unperforated. The transverse cuts 26 extending from marginal line of perforation 12 are of uniform length. Similarly, the cuts 28 extending from marginal line of perforation 16 are of uniform length. The pairs 26, 28 of cuts are spaced uniformly along the length of the web 10. Furthermore, each cut extends approximately one-third of the width of the continuous form portion 24 of the web.

A longitudinal scored line 32 extends along the inside end of cuts 26 and, similarly, a longitudinal scored line 34 extends along the inside end of cuts 28. These scored lines form continuous form marginal portions 38 and 40 on either side of the medial portion 30.

For reasons which will become more apparent hereinafter, each segment of the continuous form portion 24 between adjacent pairs of opposed transverse cuts is a sheet precursor 66 with the short (i.e. width) dimension of the sheet precursor being in line with the direction of travel of the web.

Figure 2:
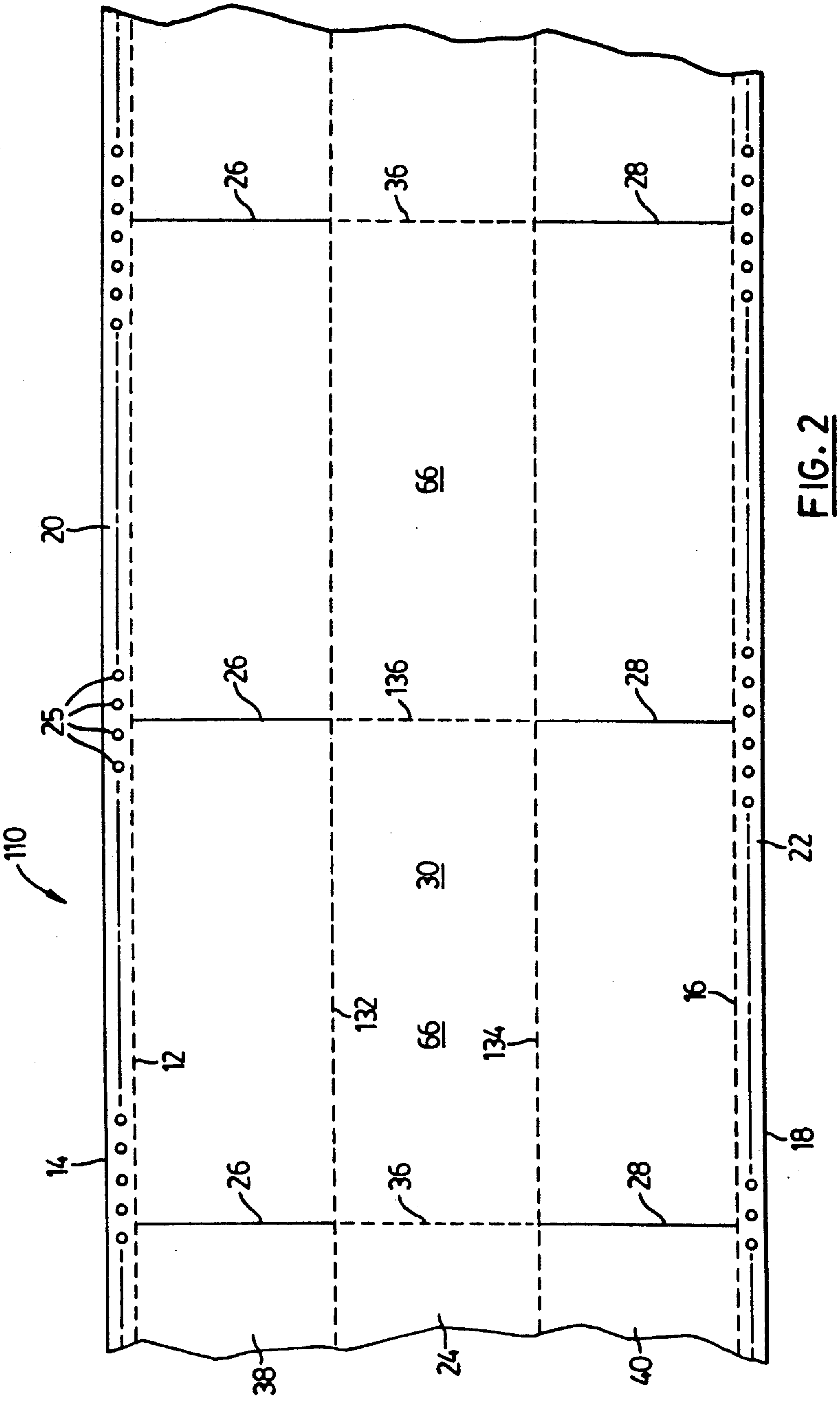
FIG. 2 is a plan view of another embodiment of a paper web made in accordance with this invention.

FIG. 2 illustrates a second embodiment of the paper web of this invention wherein like parts have been given like reference numerals. Turning to FIG. 2, web 110 has a light line of perforation 136 joining each opposed pair 26, 28 of transverse cuts. Consequently, these light lines of perforation extend across the medial web portion 30. Web 110 has a longitudinal perforated line 132 extending along the inside end of cuts 26 and a longitudinal perforated line 134 extending along the inside end of cuts 28, these take the place of the scored lines of the FIG. 1 web.

Figure 3:
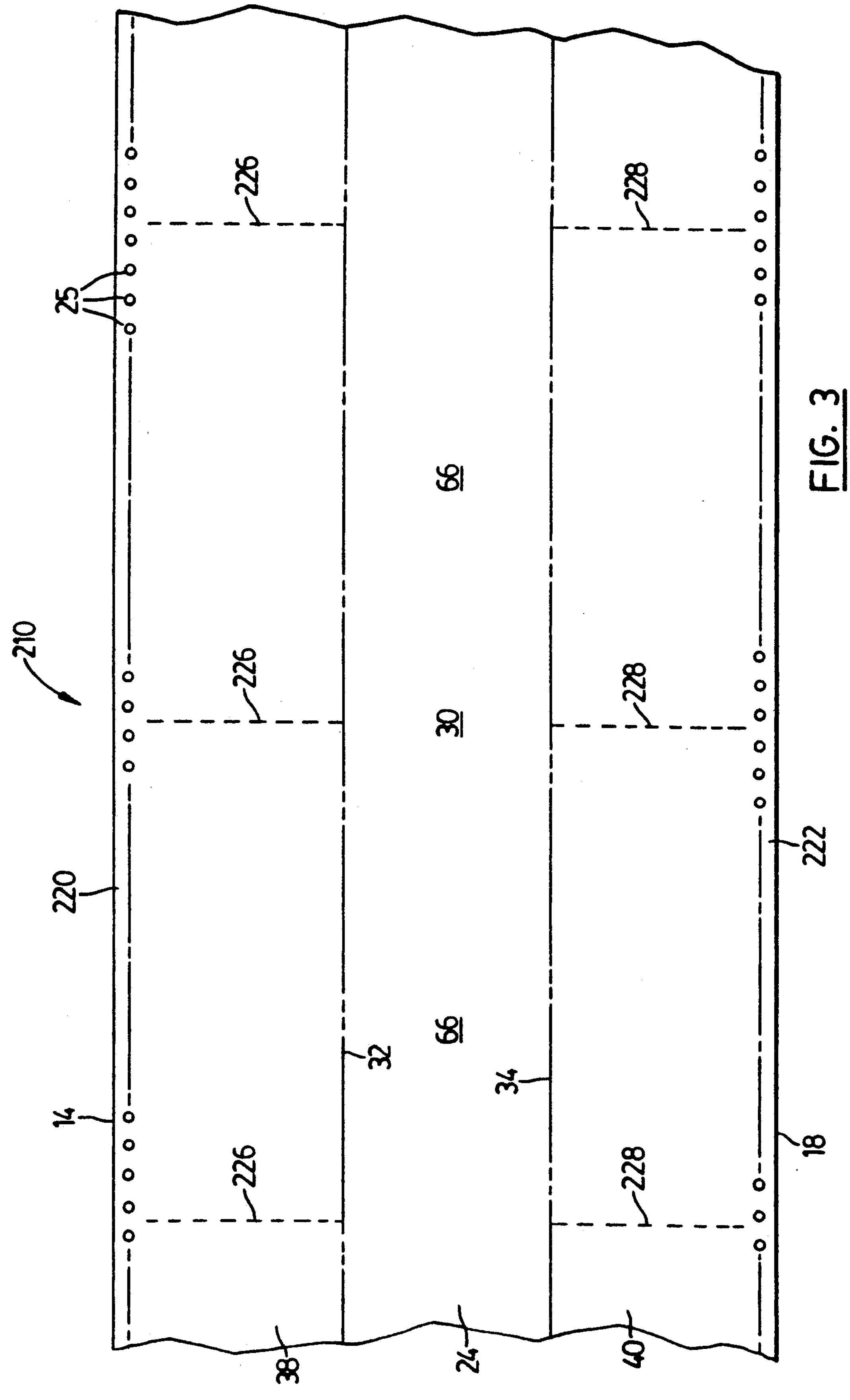
FIG. 3 is a plan view of a further embodiment of a paper web made in accordance with this invention.

FIG. 3 illustrates a third embodiment of the paper web of this invention wherein like parts have been given like reference numerals. Turning to FIG. 3, web 210 has no marginal longitudinal lines of perforation delimiting the marginal web portions 220 and 222. The continuous form portion 24 of the web has opposed pairs of transverse perforations 226, 228, with perforations 226 extending from the inner edge of marginal web portion 220 and perforations 228 extending from the inner edge of marginal web portion 222. The opposed pairs of transverse perforations leave a medial web portion 30 which is uncut and unperforated. The transverse perforations 226 extending from marginal web portion 220 are of uniform length. Similarly, the perforations 228 extending from marginal web portion 222 are of uniform length. The pairs 226, 228 of perforations are spaced uniformly along the length of the web 210.

Figure 4:
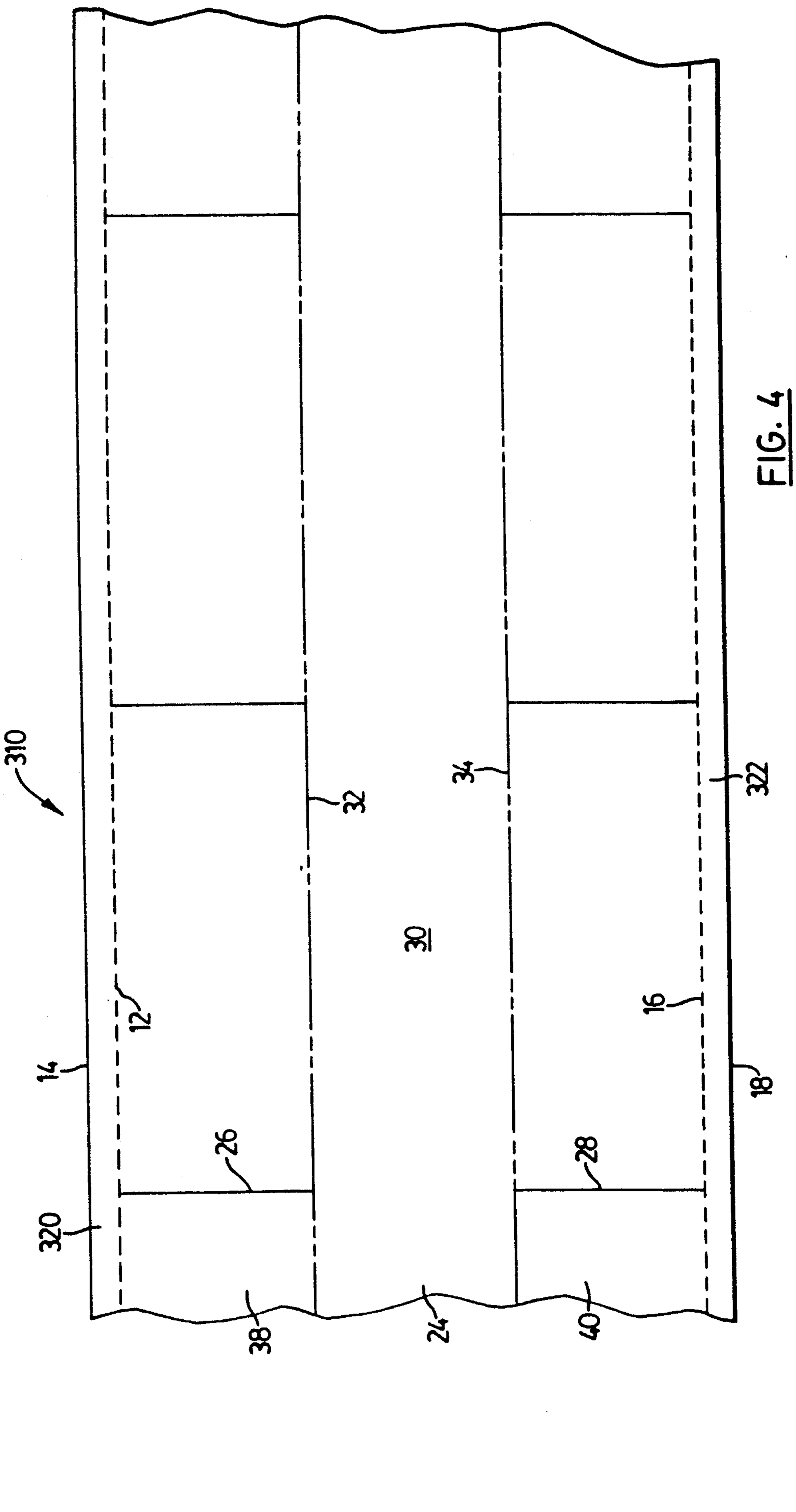
FIG. 4 is a plan view of a further embodiment of a paper web made in accordance with this invention.

FIG. 4 illustrates another embodiment of the paper web of this invention wherein like parts have been given like reference numerals. Turning to FIG. 4, web 310 has a marginal longitudinal line of perforation 12 proximate one side 14 of the web and a second marginal longitudinal line of perforation 16 proximate the other side 18 of the web which delimit marginal web portions 320 and 322. However, these marginal web portions have no pin holes.

Figures 5, 5A:
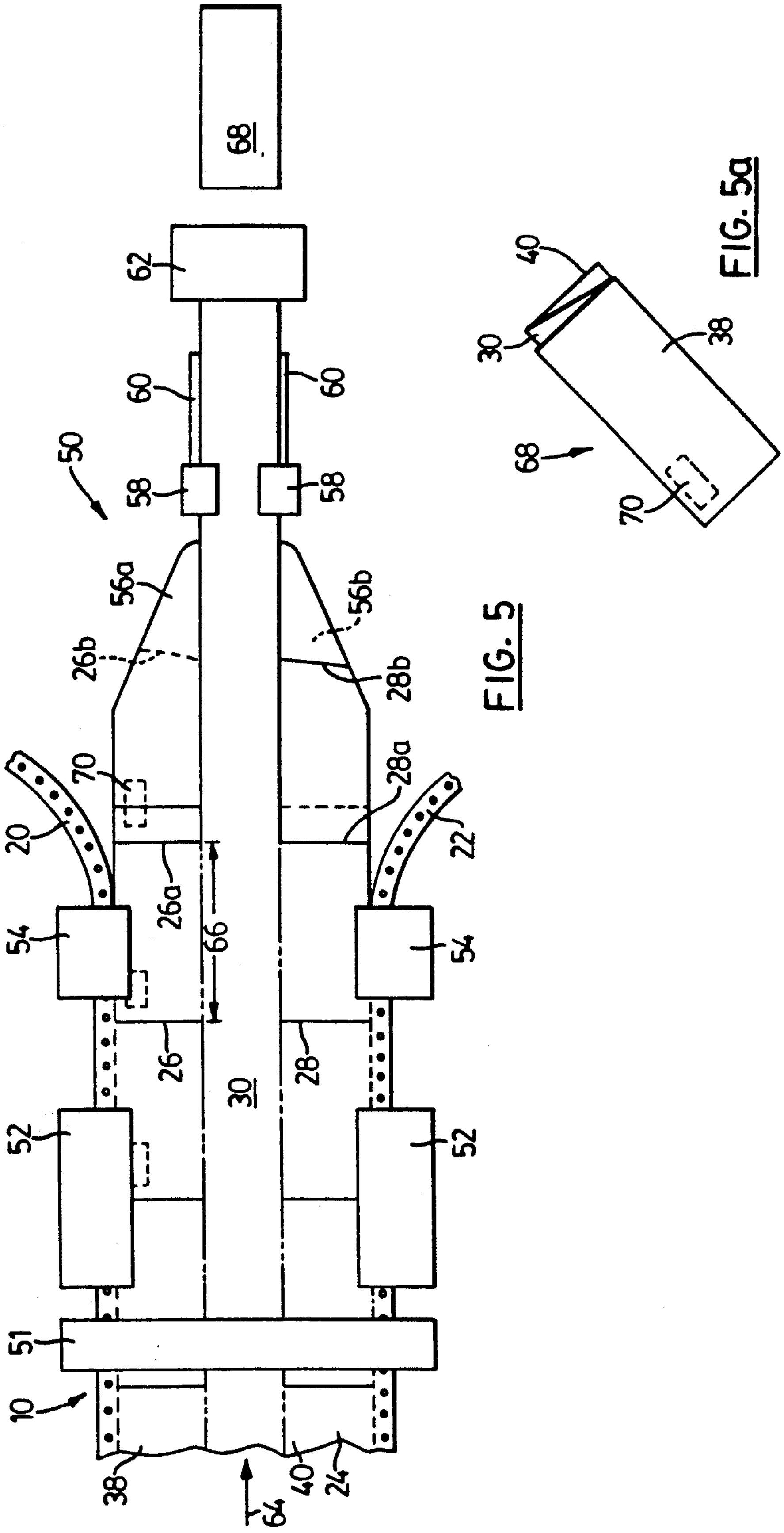
FIG. 5 shows an example machine using the paper web of this invention.
FIG. 5*a* is a bottom perspective view of a letter sheet output from the machine of FIG. 5.

FIG. 5 illustrates an example machine for using the paper web 10 of FIG. 1. Turning to FIG. 5, the machine 50 operates to move web 10 in a downstream direction 64 and comprises, in consecutive downstream order: a printing station 51, tractor feeders 52, marginal web portion separators 54, folding troughs 56*a*, 56*b*, pinch rollers 58 with associated edge guides 60, and cutting station 62. The troughs 56*a* and 56*b* have a length equal to that of the longitudinal spacing between adjacent pairs of opposed transverse cuts 26, 28 of web 10. Furthermore, the troughs are spaced downstream from the separators 54 a distance at least equal to the distance between adjacent pairs of opposed transverse cuts 26, 28.

In operation of the machine 50, printing station 51 may print text on each sheet precursor 66 including an address 70 in the top left corner of each sheet precursor, which is therefore in the marginal portion 38 of the continuous form portion of the web. Tractor feeders 52 feed web 10 in the downstream direction 64 and pinch rollers 58 provide for the feeding of the web downstream of the tractor feeders 52. At marginal web portion separators 54, the marginal web portions 20 and 22 are separated off and discarded leaving the continuous form portion 24 of the web. Downstream of separators 54, the continuous form 24 is pulled through folding troughs 56*a*, 56*b*. Trough 56*a* acts on the marginal portion 38 of the continuous form 24 to fold it under the medial portion 30 of the continuous form and trough 56*b* acts to fold marginal portion 40 of the continuous form 24 over the medial portion of the continuous form so that the continuous form has a Z-fold.

Because the troughs 56*a*, 56*b* are spaced downstream from the separators 54 a distance at least as great as the distance between adjacent pairs of opposed transverse cuts 26, 28 of the web, when any particular pair of opposed transverse cuts 26, 28 reaches troughs 56*a*, 56*b*, the next adjacent upstream pair of opposed transverse cuts has moved downstream of separators 54. Thus, when any given pair of opposed transverse cuts 26*b*, 28*b* enters troughs 56*a*, 56*b*, the marginal portions 38 and 40 of the continuous form 24 between such pair of cuts and the next adjacent upstream pair of cuts 26*a*, 28*a* are free to fold under the influence of the troughs without applying any folding force further upstream of the continuous form. But the distance between adjacent pairs of transverse cuts simply defines the width of a sheet precursor 66. Accordingly, the length of the machine 50 which is required to fold a sheet precursor 66 is twice the width of a sheet precursor. Since the width of a sheet precursor is typically 8½ inches, the length required to fold is about 17 inches.

The continuous form is kept taut at troughs 56*a* and 56*b* by tractor feeders 52 and pinch rollers 58, accordingly, there is no need to support the medial portion 30 of the continuous form at the troughs 56*a*, 56*b* and this permits the Z-folding of the sheet precursors.

The folded continuous form 24 downstream of the troughs 56*a*, 56*b* passes through the nip of pinch rollers 58 and is then kept in registration by edge guides 60. Pinch rollers 58 apply a positive downstream feeding tension on the continuous form. Note that it is the uncut medial portion 30 of the web which allows the continuous form to be pulled by the pinch rollers 58. The folded continuous form then passes to cutter 62 which severs the medial portion 30 of the continuous form at each opposed pair of transverse cuts to thereby form sheets 68 from the sheet precursors 66. FIG. 5*a* illustrates a folded sheet 68 in bottom perspective view. It will be apparent that the sheet 68 has been folded so that the printed address faces outwardly from the underneath of the sheet.

Because the web of this invention allows folding in the direction of movement of the web rather than transversely thereto, it will be apparent that the web may be folded even where thick inserts have been adhered to the medial portion 30 of the web 10. Furthermore, it will be noted that since the sheets 68 are severed only after folding, registration for folding is made simple since the web is held in registration by tractor feeders 52, pinch rollers 58 and edge guides 60.

To adapt the machine 50 for use with the forms of FIG. 2, the cutter 62 may be replaced by a separator station. With the forms of FIG. 2, it is also necessary to ensure the web speed is such so as not to cause separation of the web at the light perforation lines 136 before the continuous form portion of the web is separated at these lines in the separator at the downstream end of the machine.

To adapt the machine 50 for use with the forms of FIG. 3, marginal web portion separators 54 comprise slitters which slit the marginal web portions from the continuous form portion. Furthermore, a bursting or cutting station must be added between separators 54 and troughs 56*a*, 56*b*. This bursting or cutting station separates the continuous form at the transverse perforations 226, 228 so that the sheet precursors 66 of the form may be folded through the troughs. Additionally, cutting station 62 may comprise a double knife to cut the sheet precursors at either side of now separated perforations 226, 228 so as to leave a clean cut sheet.

To adapt the machine 50 for use with the forms of FIG. 4, the tractor feeders 52 are replaced with pinch rollers which grip the marginal portions 320 and 322 of the web 310 to feed the web.

The web of this invention could be modified so the cuts 26 (or perforations 226) are longer than the cuts 28 (or perforations 228); in such case the continuous form portion of the web could be folded three times rather than twice. This has application where the sheets which will be formed from the sheet precursors are longer, for example, where the sheets are 14 inches in length (legal size paper).

It will be apparent that the FIG. 1 or FIG. 2 web could be modified so that the marginal longitudinal lines of perforation 12, 16 were omitted. In such case, the marginal web portions 20, 22 of these webs would be slit from the continuous form portion. On the other hand, such longitudinal lines of perforation could be added to the web of FIG. 3. Further, the web of FIGS. 1, 2, or 3 could be modified so that the marginal web portions did not have pin holes 25. It will also be apparent that score lines 32, 34 of the web of FIGS. 1 and 3 could be replaced by the perforation lines 132, 134 of FIG. 2. Conversely, the perforation lines 132, 134 of FIG. 2 could be replaced with score lines.

When used with the webs of FIG. 1, the cutter 62 of machine 50 could be a double knife cutter for the reason that a single knife might not be completely accurately lined up with the cuts 26, 28 when cutting. Thus, the double knife arrangement would assist in ensuring each sheet 68 had clean cut edges.

Other modification will be apparent to those skilled in the art and, accordingly, the invention is defined in the claims.

What is claimed is:

1. A paper web providing a continuous form, comprising:

two marginal web portions, one proximate each side of the web, for permitting feeding of the web;

a continuous form portion interior of said marginal web portions;

a plurality of opposed pairs of transverse lines formed by cuts or perforations, one line of each opposed pair extending in said continuous form portion of said web from one of said two marginal web portions to a central web portion and the other line of each opposed pair extending in said continuous form portion of said web from the other of said two marginal web portions to said central web portion, said central portion being at least substantially free of any transverse cuts or perforations which are aligned with any of said opposed pairs of transverse lines and, all transverse lines of said plurality of said opposed pairs of transverse lines which extend from a given one of said two marginal web portions being of uniform length, and said central portion having a width about as great as the length of the shortest of said transverse lines.

2. The paper web of claim 1 wherein said two marginal web portions each have a longitudinal array of pin holes for permitting tractor feeding of the web.

3. The paper web of claim 1 wherein each of said transverse lines extend approximately one-third of the width of the continuous form portion of said web.

4. The paper web of claim 1 wherein each of said plurality of opposed pairs of transverse cut or perforation lines are linear.

5. The paper web of claim 4 further comprising a longitudinal scored or perforated line extending along the inside end of all transverse lines of said plurality of said opposed pairs of transverse lines which extend from one of said two marginal web portions and a longitudinal scored or perforated line extending along the inside end of all transverse lines of said plurality of said opposed pairs of transverse lines which extend from the other of said two marginal web portions.

6. The paper web of claim 5 wherein said plurality of opposed pairs of transverse lines are uniformly longitudinally spaced along said web.

7. The paper web of claim 6 wherein each of said two marginal web portions are delimited by a longitudinal line of perforation.

* * * * *

US005275857B1

REEXAMINATION CERTIFICATE (3050th)

United States Patent [19]

[11] B1 5,275,857

Long

[45] Certificate Issued Nov. 5, 1996

[54] CONTINUOUS FORM

[76] Inventor: John A. Long, 41 Lamont Ave., Scarborough, Ontario, Canada, M1S 1A8

Reexamination Request:
No. 90/004,149, Feb. 22, 1996

Reexamination Certificate for:

| | |
|---|---|
| Patent No.: | **5,275,857** |
| Issued: | **Jan. 4, 1994** |
| Appl. No.: | **816,712** |
| Filed: | **Jan. 3, 1992** |

Related U.S. Application Data

[63] Continuation-in-part of Ser. No. 800,285, Nov. 29, 1991, Pat. No. 5,219,631.

[51] Int. Cl.[6] ........ B32B 3/10

[52] U.S. Cl. ........ 428/43; 428/136; 281/5; 462/26; 462/46

[58] Field of Search ........ 428/43, 136, 131, 428/156; 281/5; 462/26, 46, 25, 6, 2, 3; 283/62

[56] References Cited

U.S. PATENT DOCUMENTS

| | | | |
|---|---|---|---|
| 465,588 | 12/1891 | Wheeler | 428/43 |
| 2,009,857 | 7/1935 | Potdevin | 93/18 |
| 2,377,348 | 6/1945 | Lee | 283/62 |
| 3,902,655 | 9/1975 | Huffman | 229/69 |
| 4,033,611 | 7/1977 | Johnsen | 283/6 |
| 4,050,361 | 9/1977 | Traise | 93/1 F |
| 4,378,223 | 3/1983 | Branecky et al. | 493/439 |
| 4,726,970 | 2/1988 | Morrish et al. | 462/6 |
| 5,071,167 | 12/1991 | O'Brien | 283/79 |

FOREIGN PATENT DOCUMENTS

| | | | |
|---|---|---|---|
| 794233 | 9/1968 | Canada | 281/5 |

*Primary Examiner*—Alexander S. Thomas

[57] ABSTRACT

A paper web comprises separable marginal web feed portions surrounding a continuous form. The continuous form has regularly longitudinal spaced opposed pairs of transverse cut lines extending from each marginal web portion. The pairs of transverse lines leave an uncut middle portion of the web and furthermore the lines extending from each marginal web portion are of uniform length. A perforation or score line runs longitudinally along the inner end of the transverse lines extending from each marginal portion. This web construction permits the continuous form portion of the web to be folded in the direction of motion of the web over the shortest known distance prior to cutting or separating the web at the opposed pairs of lines to form folded sheets. In another embodiment, the transverse cut lines may be replaced by transverse perforation lines in which case the web is burst at these lines prior to folding.

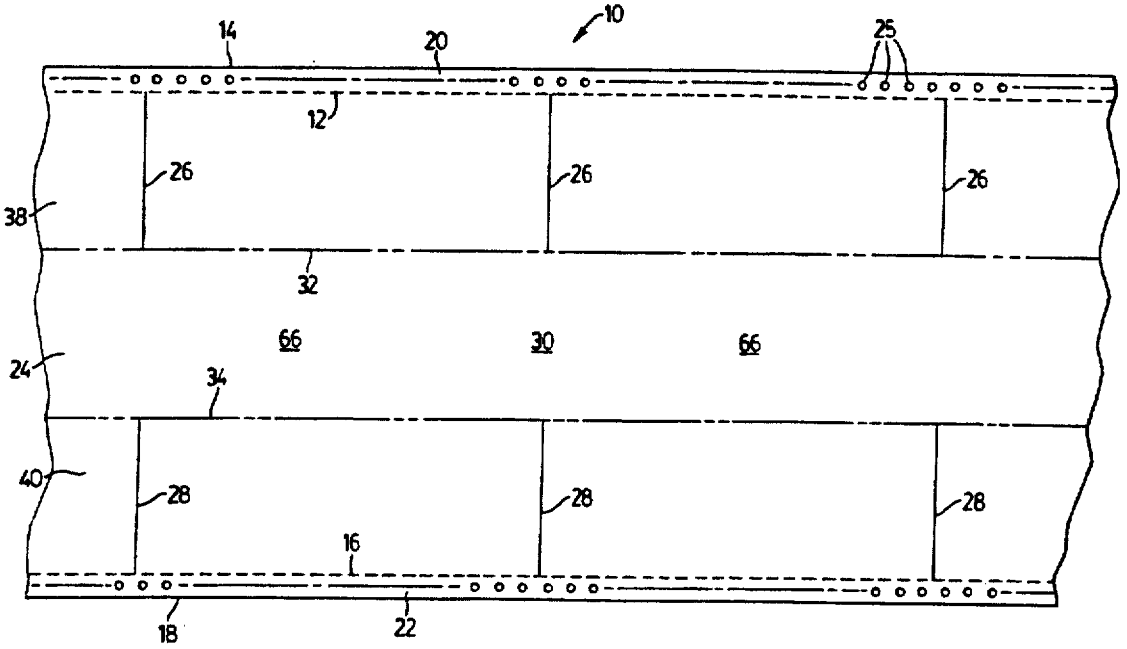

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 13 to 32:

[Accordingly] *According* to the present invention, there is provided a paper web providing a continuous form, comprising: two marginal web portions, [once] *one* proximate each side of the web for permitting tractor feeding of the web; a continuous form portion interior of said marginal web portions; a plurality of opposed pairs of transverse cut or perforation lines, one line of each opposed pair extending in said continuous form portion of said web from one of said two marginal web portions *to a central web portion* and the other line of each opposed pair extending in said continuous form portion of said web from the other of said two marginal web portions *to said central web portion*, [the continuous form portion of said web having a] *said* central portion being at least substantially free of any transverse cuts or perforations [which are aligned with any opposed pair of transverse lines], all transverse lines of said plurality of said opposed pairs of transverse cut or perforation lines which extend from a given one of said two marginal web portions being of uniform length and said central portion having a width about as great as the length of the shortest of said transverse cut or perforation lines.

AS A RESULT OF REEXAMINATION, IT HAS BEEN DETERMINED THAT:

Claim 1 is determined to be patentable as amended.

Claims 2–7, dependent on an amended claim, are determined to be patentable.

1. A paper web providing a continuous form, comprising:

two marginal web portions, one proximate each side of the web, for permitting feeding of the web;

a continuous form portion interior of said marginal web portions;

a plurality of opposed pairs of transverse lines formed by cuts or perforations, one line of each opposed pair extending in said continuous form portion of said web from one of said two marginal web portions to a central web portion and the other line of each opposed pair extending in said continuous form portion of said web from the other of said two marginal web portions to said central web portion, said central portion being at least substantially free of any transverse cuts or perforations [which are aligned with any of said opposed pairs of transverse lines] and, all transverse lines of said plurality of said opposed pairs of transverse lines which extend from a given one of said two marginal web portions being of uniform length, and said central portion having a width about as great as the length of the shortest of said transverse lines.

* * * * *